United States Patent [19]
Tanaka

[11] Patent Number: 4,606,657
[45] Date of Patent: Aug. 19, 1986

[54] SYNTHETIC RESIN BALL BEARING
[75] Inventor: Kouichi Tanaka, Nagoya, Japan
[73] Assignee: Kabushiki Kaisha Chubu Bearing Seisakusho, Japan
[21] Appl. No.: 754,224
[22] Filed: Jul. 12, 1985
[30] Foreign Application Priority Data
  Jul. 13, 1984 [JP] Japan .................. 59-144324
[51] Int. Cl.⁴ .......................................... F16C 33/60
[52] U.S. Cl. .................... 384/492; 384/504; 384/505; 384/539; 384/615
[58] Field of Search ............... 384/492, 504, 505, 615, 384/539, 510

[56] References Cited
U.S. PATENT DOCUMENTS

| | | | |
|---|---|---|---|
| 1,353,874 | 9/1920 | Wego | 384/505 |
| 1,546,363 | 7/1925 | Beemer | 384/504 |
| 1,615,810 | 1/1927 | Du Mazuel | 384/505 |
| 3,722,968 | 3/1973 | Bomberger | 384/492 |

Primary Examiner—Lenard A. Footland
Attorney, Agent, or Firm—Lowe, Price, Leblanc, Becker & Shur

[57] ABSTRACT

A synthetic resin ball bearing. It comprises an outer race, an inner race and a plurality of balls provided therebetween. The outer race is composed of a first cup-shaped member and a second cup-shaped member. Each cup-shaped member has an opening in the center of the floor portion. The first cup-shaped member is sized to snugly fit generally in the second cup-shaped member. The inner race has an annular shape to be positioned to extend through said respective openings in the first and second cup-shaped members to define an annular chamber in cooperation of said first cup-shaped member and the floor wall of the second cup-shaped member. The annular projection extends into the chamber to define a pair of ball receiving sections. The balls are accommodated within the ball receiving sections.

5 Claims, 5 Drawing Figures

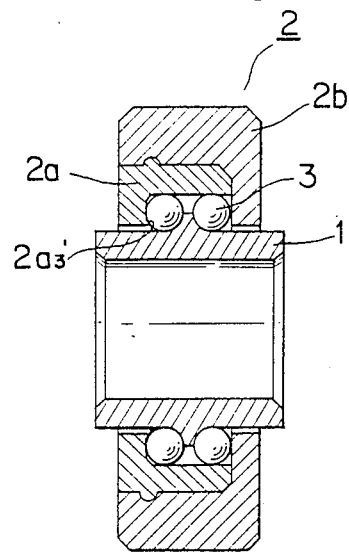
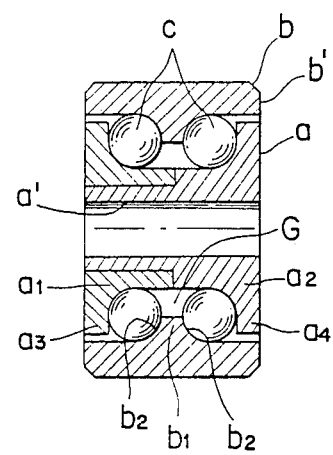
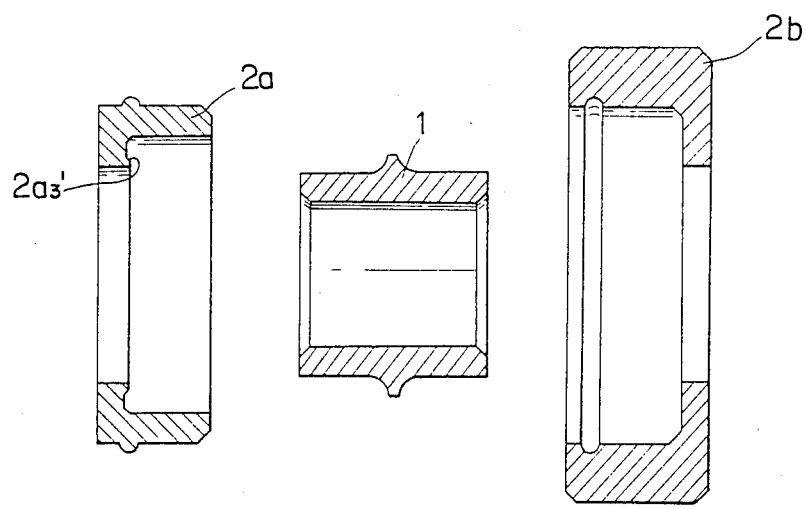

SYNTHETIC RESIN BALL BEARING

BACKGROUND OF THE INVENTION

This invention relates to a ball bearing made of a synthetic resin material which can sufficiently bear not only a radial load but also a thrust load.

Conventionally as shown in FIG. 5, steel balls c are arranged in two rows between an inner race a made of a synthetic resin material having a bore a' and an outer race b also made of a synthetic resin material. The inner race a comprises a small diameter half $a_1$ and a large diameter half $a_2$ fitted each other. A plurality of steel balls c are nested in an annular groove G defined by side walls $a_3$ and $a_4$ of the respective halves $a_1$ and $a_2$ opposite each other. The balls c are arranged in two rows by an annular projection $b_1$ formed in an intermediate portion of the inner surface of the outer race b. Both side surfaces $b_2$ of the annular projection $b_1$ are formed generally rounded so that they will be totally snugly contacted with the outer surfaces of the balls c.

However, with the above construction, since the dimension of the side wall portion b' of the outer race b is small compared with the inner race a mounted to the shaft through the bore a', the thrust load cannot be easily applied to the outer race portion of the synthetic resin bearing. Especially, when the bearing is made small, it is almost impossible to apply the thrust load thereto.

Similarly, with the above construction, the peripheral diameter of the surface of the ball is large. Therefore, since the wear of the rolling balls as well as the wearing amount of the surface of the passage on which the balls contact are large, the service life of the bearing is short. Moreover, since the space between the inner race and the outer race is positioned at the outer peripheral portion of the bearing as a while, the internal grease leaks out due to the centrifugal force. Moreover, since the demension of the opening portion is large, dust proof performance is poor.

The present invention has been accomplished in order to solve the above problems.

SUMMARY OF THE INVENTION

It is therefore a general object of the present invention to provide a synthetic resin bearing in which the above mentioned problems inherent to the prior art bearing is eliminated.

In order to achieve the above object, there is essentially provided a synthetic resin ball bearing comprising an outer race of a synthetic resin material to receive external load thereon, said race including a first cup-shaped member and a second cup-shaped member, each cup-shaped member having an annular wall with a brim end and a bottom end and a floor wall integrally extending from said bottom end to define a recess therein, said floor wall having an opening in a center thereof, said first cup-shaped member being sized to snugly fit generally in said recess of the second cup-shaped member, said brim end of the first cup-shaped member abutting against the floor wall of the second cup-shaped member, said opening in the floor walls of the respective first and second cup-shaped members being in alignment with each other; an inner race of a synthetic material having an annular shape to be inserted into said outer races through said respective openings to define an annular chamber in cooperation of said first cup-shaped member and said floor wall of the second cup-shaped member, said inner race having an annular projection extending into said chamber to define a pair of balls receiving sections; and a pluality of balls received within each receiving section annularly around said inner race.

BRIEF DESCRIPTION OF THE DRAWINGS

FIG. 3 is a sectional view showing another embodiment of the present invention;

FIG. 4 is an exploded sectional view of the above; and

FIG. 5 is a sectional view of a conventional ball bearing.

DETAILED DESCRIPTION OF THE EMBODIMENTS

Preferred embodiments of the present invention will be described hereunder with reference to the accompanying drawings.

Figure 1:
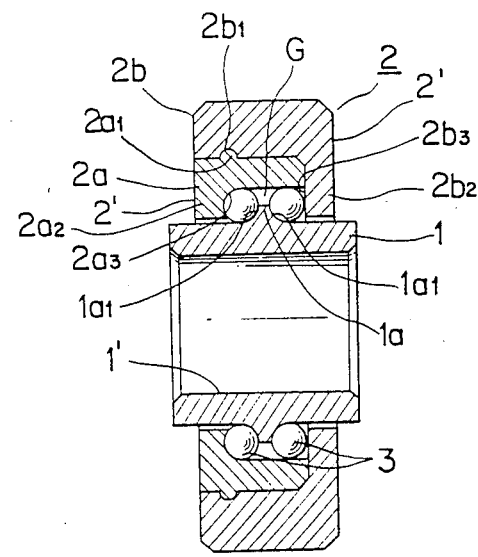
FIG. 1 is a sectional view showing one embodiment of the present invention.
Figure 2:
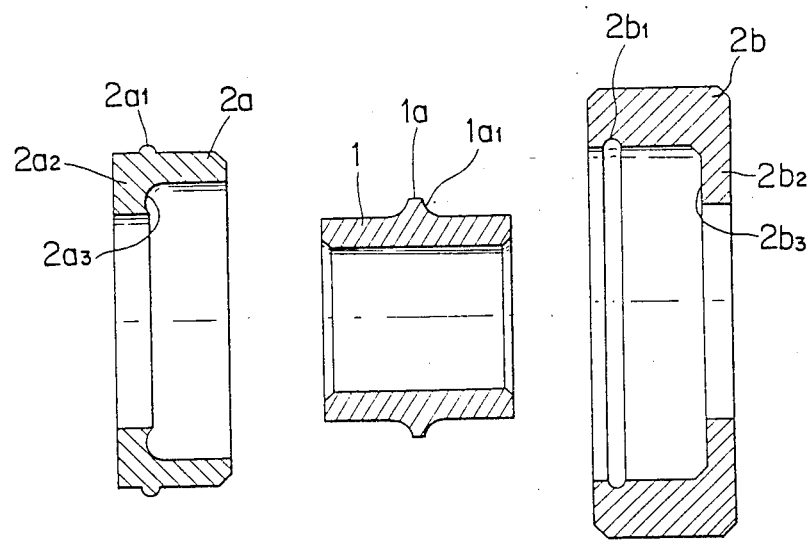
FIG. 2 is an exploded sectional view of the above.

In FIGS. 1 and 2, 1 denotes an inner race having an annular shape and made of a synthetic resin material. Said inner race 1 has a bore 1' for allowing a shaft to be inserted therethrough. 2 denotes an outer race to receive external load thereon and similarly made of a synthetic resin material. The outer race 2 comprises a first cup-shaped member 2a having a relatively small diameter and a second cup-shaped member 2b having a relatively large diameter fitted together. Each cup-shaped member has an annular wall with a brim end and a bottom end, and a floor wall $2a_2$ or $2b_2$ integrally extending from said bottom end to define a recess therein. Said floor wall $2a_2$ or $2b_2$ has an opening in a center thereof. Said first cup-shaped member 2a is sized to snugly fit generally in said recess of the second cup-shaped member $2b_2$. When assembled, the brim end of the first cup-shaped member 2a abuts against the floor wall of the second cup-shaped member 2b. Said openings in the floor walls of the respective first and second cup-shaped members are, when assembled, in alignment with each other. The first cup-shaped member 2a is formed with an annular knob $2a_1$, while the second cup-shaped member 2b is formed with an annular recess $2b_1$ at opposite positions with respect to each other for mutual engagement. Said inner race 1 is positioned to extend through the respective openings in the floor walls of the respective cup-shaped members 2a and 2b to define an annular chamber G in cooperation of the first cup-shaped member and the floor wall of the second cup-shaped member.

Provided at the central portion in the outer periphery of the inner race 1 is an annular porjection 1a. The projection 1a is projected in an annular chamber G which, when assembled, is defined by the floor walls $2a_2$ and $2b_2$ of the outer race 2 opposite with respect to each other, and served to divide a number of steel balls 3 contained within the annular chamber G in the form of two rows of ball receiving section. The annular projection 1a is formed with a pair of rounded guide surface $1a_1$ at both sides thereof. The guide surfaces $1a_1$ are such designed as to be in agreement with the balls 3. Similarly, the first cup-shaped member 2a having the smaller diameter is formed at its inner surface with a rounded guide surface $2a_3$ which is annularly extending around said inner race in agreement with the balls 3. The inner race 1 made of a metallic material.

In the above embodiment, the first cup-shaped member 2a having the smaller diameter and the second cup-shaped member 2b having the larger diameter are brought to be in engagement with each other by press fitting the annular projection $2a_1$ into the annular recess $2b_1$. Alternatively, the engagement between the first and second cup-shaped members 2a and 2b may be maintained by other attaching means using, for example, epoxy adhesive, supersonic welding means, mechanical attaching means using, for example, screws, induction brazing means, or hot-wire welding means.

With the above constitution, when the inner race 1 and the outer race 2 are provided with a number of steel balls 3 disposed in each receiving section formed therebetween, the balls 3 are arranged in two rows. Each of the steel balls 3 is contacted and supported by the rounded guide surface $1a_1$ of the annular projection 1a of the inner race 1 and the inner surfaces $2a_3$ and $2b_3$ of the floor walls $2a_2$ and $2b_2$ of the outer race 2.

When the bearing is constituted as described in the above, a thrust load can be applied to the bearing through a vast side wall portion 2' of the outer race 2 as a whole. In this embodiment, the floor wall of the first cup-shaped member has an inner surface arcuately extending.

In a second embodiment as shown in FIGS. 3 and 4, a rounded guide surface is not formed on the inner guide surface of the floor wall $2a^2$ of the first cup-shaped member 2a having the smaller diameter. Instead, said inner guide surface generally extends flatly. However, said inner surface starts, in the vicinity of the opening, to rise increasingly theretoward to form an annular projection. Such rounded guide surface $2a^3$ or annular projection $2a^3$, prevents the steel balls from dropping at a time of assembly.

As described in the foregoing, the bearing according to . the present invention comprises an inner race having an opening for allowing a shaft to be inserted therethrough, an outer periphery of the inner race being formed at its central portion with an annular projection for arranging a number of steel balls in two rows, the annular projection having rounded guide surfaces at both sides thereof, an outer race comprising a first cup-shaped member having a comparatively small diameter and a second cup-shaped member having a comparatively large diameter, and provided with an annular projection and an annular recess opposite each other for mutual engagement, the outer race being formed with an annular chamber defined by floor walls of the first and second cup-shaped members for accommodating the balls therein, and a number of steel balls positioned on the both sides of said annular projection on the outer periphery of the inner race and, when assembled, within the annular chamber of the outer race in such a fashion as to contact the rounded guide surfaces of the annular projection as well as the floor walls. In the bearing made of a synthetic resin material for radial and thrust loads wherein balls are arranged in two rows in order to increase the durability, the thrust load can be surely received through the floor wall portion of the outer race due to the structure wherein the dimension of the floor wall portion is considerably increased. In this case, a sufficient strength or durability can be maintained, since the floor wall portion is such disigned as to be directly supported by the balls.

Furthermore, since the peripheral diameter of the transmitting surface of the ball is small, the peripheral velocity of the ball is small. Consequently, the wear of the ball as well as the wearing amount of the passage surface contacting the ball can be reduced. Thus, the service life of the bearing can be prolonged. Moreover, since the space between the inner race and the outer race is provided at the internal peripheral portion of the bearing as a whole, the influence of the centrifugal force is less. Consequently, the grease can be prevented from scattering. Similarly, since the dimension of the space is small, the dust-proof performance is improved.

Furthermore, since the inner race is a part of a single body, the bearing accuracy is excellent and stable. Since the thickness of the inner race is comparatively thin, the heat generated inside thereof due to rotation can be released to the shaft easily. In addition, since the internal vibration as well as noise during rotation is absorbed by the outer race, and the space between the outer and inner races is small as described, the noise can be made less during operation.

Although the present invention has been described with reference to the preferred embodiments, many modifications and alternations may be made within the spirit of the invention.

What is claimed is:

1. A synthetic resin ball bearing comprising
   an outer race of a synthetic resin material to receive external load thereon, said race including a first cup-shaped member and a second cup-shaped member, each cup-shaped member having an annular wall with a brim end and a bottom end and a floor wall integrally extending from said bottom end to define a recess therein, said floor wall having an opening in a center thereof, said first cup-shaped member being sized to snugly fit generally in said recess of the second cup-shaped member, said brim end of the first cup-shaped member abutting against the floor wall of the second cup-shaped member therewithin, said openings in the floor walls of the respective first and second cup-shaped members being in alighnment with each other;
   an inner race of a synthetic resin material having an annular shape to be positioned to extend through said respective openings in the first and second cup-shaped members to define annular chamber in cooperation of said first cup-shaped member and said floor wall of the second cup-shaped member, said inner race having an annular projection extending into said chamber to define a pair of ball receiving sections; and
   a plurality of balls within each receiving section annularly around said inner race.

2. A synthetic resin bearing according to claim 1, wherein said annular projection defines a pair of rounded guide surfaces.

3. A synthetic resin bearing according to claim 1, wherein said first cup-shaped member has a rounded inner guide surface annularly extending around said inner race.

4. A synthetic resin bearing according to claim 1, wherein said floor wall of the first cup-shaped member has an inner guide surface generally extending flatly, said inner guide surface starts, in a vicinity of the opening, to rise increasingly theretoward to form an annular projection.

5. A synthetic resin bearing according to claim 1, wherein said frist and second cup-shaped members have press-fit engagement means to engage each other.

* * * * *